United States Patent
Callegari et al.

(10) Patent No.: US 10,776,979 B2
(45) Date of Patent: Sep. 15, 2020

(54) VIRTUAL SKELETON BASED ON COMPUTING DEVICE CAPABILITY PROFILE

(71) Applicant: MICROSOFT TECHNOLOGY LICENSING, LLC, Redmond, WA (US)

(72) Inventors: Shawn Cantin Callegari, Redmond, WA (US); Brad Steven Kertson, Redmond, WA (US); Rowan Forster, Seattle, WA (US); David Warren Stevens, Bothell, WA (US); Michael John Bray, Redmond, WA (US); Susan Chory, Seattle, WA (US); Richard Lawrence Harrington, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 15/995,009

(22) Filed: May 31, 2018

(65) Prior Publication Data

US 2019/0371031 A1 Dec. 5, 2019

(51) Int. Cl.
*G06T 13/40* (2011.01)
*H04L 29/08* (2006.01)
*H04L 29/06* (2006.01)

(52) U.S. Cl.
CPC .......... *G06T 13/40* (2013.01); *H04L 67/1097* (2013.01); *H04L 67/42* (2013.01)

(58) Field of Classification Search
CPC .................................................... G06T 13/40
See application file for complete search history.

(56) References Cited

U.S. PATENT DOCUMENTS

| 7,991,401 | B2 | 8/2011 | Linder et al. |
| 8,384,719 | B2 | 2/2013 | Reville et al. |
| 9,159,151 | B2 | 10/2015 | Perez et al. |
| 9,536,274 | B2* | 1/2017 | Iwagaki .................. G06T 1/00 |
| 2001/0019333 | A1* | 9/2001 | Sasaki ................. A63F 13/10 |
| | | | 345/653 |
| 2001/0026278 | A1* | 10/2001 | Arai ..................... G06T 9/001 |
| | | | 345/474 |
| 2002/0124050 | A1* | 9/2002 | Middeljans ...... H04N 21/44204 |
| | | | 709/203 |

(Continued)

FOREIGN PATENT DOCUMENTS

| EP | 3029635 A1 | 6/2016 |
| WO | 2014022608 A2 | 2/2014 |

OTHER PUBLICATIONS

"Avatar SDK", Retrieved From https://avatarsdk.com/, Retrieved on: Mar. 29, 2018, 7 Pages.

(Continued)

*Primary Examiner* — Phi Hoang
(74) *Attorney, Agent, or Firm* — Newport IP, LLC; Michael Johnson

(57) ABSTRACT

A virtual skeleton may be adapted based on a capability profile. The virtual skeleton adapted based on a capability profile may be generated from a master virtual skeleton. The adapted virtual skeleton may be less complex than the master virtual skeleton. The adapted virtual skeleton may include fewer virtual skeletal joints than a number of virtual skeletal joints associated with the master virtual skeleton.

20 Claims, 8 Drawing Sheets

(56) References Cited

U.S. PATENT DOCUMENTS

| | | | | |
|---|---|---|---|---|
| 2008/0137755 | A1* | 6/2008 | Onur | H04N 19/115 375/240.26 |
| 2012/0054261 | A1* | 3/2012 | Evans | G06F 9/54 709/203 |
| 2015/0024852 | A1 | 1/2015 | Pacey et al. | |
| 2015/0271094 | A1* | 9/2015 | Lin | H04L 63/145 709/226 |
| 2017/0024112 | A1* | 1/2017 | McKegney | G06F 3/04847 |
| 2017/0216722 | A1 | 8/2017 | Kruglick | |
| 2018/0330480 | A1* | 11/2018 | Liu | G06T 17/20 |

OTHER PUBLICATIONS

"DeepMotion: Avatar", Retrieved From https://web.archive.org/web/20171214124337/https://www.deepmotion.com/avatar, Dec. 14, 2017, 7 Pages.

"Mixamo", Retrieved From https://web.archive.org/web/20160505011949/https://www.mixamo.com/, May 5, 2016, 4 Pages.

Ichim, et al., "Dynamic 3D Avatar Creation from Hand-held Video Input", In Journal of ACM Transactions on Graphics, vol. 34, Issue 4, Aug. 2015, 14 Pages.

"International Search Report and Written Opinion Issued in PCT Application No. PCT/US2019/032341", dated Aug. 8, 2019, 11 Pages.

\* cited by examiner

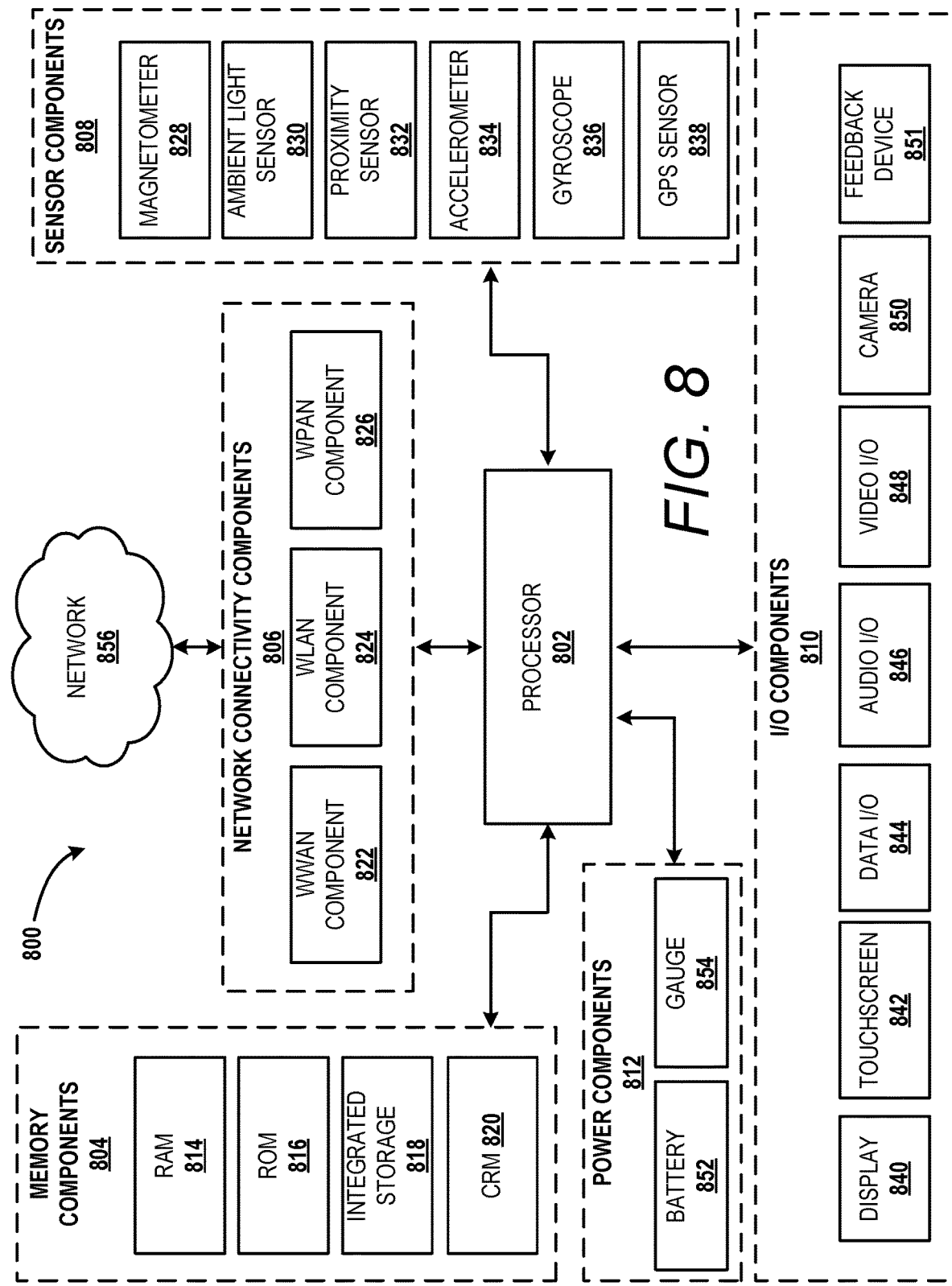

VIRTUAL SKELETON BASED ON COMPUTING DEVICE CAPABILITY PROFILE

BACKGROUND

An avatar is often a computer representation of a user. The avatar typically takes the form of a two-dimensional (2D) or three-dimensional (3D) model in various environments such as computer games, applications, chats, forums, communities, and instant messaging services, for example.

Avatars typically include meshes that represent surfaces of the computer representation of the user. The meshes may include contours that depict 3D aspects of the computer representation of the user. A mesh is often generated at the direction of a human designer. Traditionally, the designer manually generates virtual items, such as eyeballs, and manually associates the virtual items with the mesh to generate an avatar.

An avatar may be animated, for example, by manipulating the mesh of the avatar using a virtual device that may be referred to as a virtual skeleton or rig. A virtual skeleton usually includes a collection of inter-related reference points that correspond to portions of the mesh. The virtual skeleton changes the relationships between the interconnected reference points to manipulate the mesh. Each manipulation of the mesh corresponds to a respective configuration of the avatar.

Configurations of avatars are often depicted using sequential virtual snapshots that represent respective physical configurations of the corresponding object. For example, configurations of an avatar that represents a video conference participant may illustrate movements (e.g., eye, lip, head, and arm movements) of the participant during the video conference. In accordance with this example, the configurations may be communicated to other participants of the video conference.

Conventional techniques for providing an avatar virtual skeleton involve tedious design of the avatar virtual skeleton based on a computer application or computer environment that will implement or use the virtual skeleton. The design or selection of the virtual skeleton is often time consuming. Furthermore, the design the virtual skeleton often necessitates use of a computer user interface (UI). Such interface time with the computer UI may cause undesirable memory use, processor use and/or battery drain associated with a computing device that implements the computer UI used to design or select the virtual skeleton.

SUMMARY

The disclosed techniques provide methods and systems that provide a virtual skeleton adapted based on a capability profile. In some implementations, the virtual skeleton adapted based on a capability profile is generated from a master virtual skeleton. The adapted virtual skeleton may be less complex than the master virtual skeleton. Specifically, in some implementations, the adapted virtual skeleton may include fewer virtual skeletal joints than a number of virtual skeletal joints associated with the master virtual skeleton.

The implementations described herein address the technical need to provide virtual skeletons based on capabilities associated with computing devices. To address at least this technical need, the implementations described herein provide computing devices that analyze capability profiles to generate adapted virtual skeletons based on a virtual skeleton that may be a master virtual skeleton or a highly detailed virtual skeleton.

At least one benefit of providing adapted virtual skeletons is the reduction of unnecessary processor overhead associated with the use of computing devices to generate individual virtual skeletons for a plurality of computing devices. The elimination of unnecessary processor overhead reduces battery drain and eliminates unnecessary memory use associated with computing devices.

Another technical benefit is that the use of virtual skeletons adapted to the capabilities of computing devices greatly reduces the processor and graphic loads required to render virtual skeletons on displays associated with the computing devices. Again, reduction of unnecessary processor overhead reduces battery drain and lowers unnecessary memory use associated with computing devices.

Yet another technical benefit of at least some of the described implementations is that the use of virtual skeletons adapted to the capabilities of computing devices, such as the avatar motion inputs associated with the computing devices, provides accurate rendering of avatar movements based on user movements observed by the computing devices. Accurate rendering of avatar movements reduces unnecessary processor overhead, reduces battery drain and lowers unnecessary memory use associated with the computing devices. Other technical benefits not specifically identified herein can also be realized through implementations disclosed in the following.

In some implementations, the capability profile may include a hardware profile associated with a computing device that is to use an adapted virtual skeleton. The hardware profile may set forth one or more functional capabilities (e.g., processor power, storage capability, etc.) associated with the computing device. The hardware profile may further specify if the computing device includes a head tracking system, camera, voice recognition system, body movement sensors (e.g., kinetic sensors), eye gaze detection system, finger tracking devices, activity determination system (e.g., walking, exercising, etc.), and the like, and combinations of the same.

The disclosed methods and systems may analyze the capability profile to determine a manner in which to adapt the master virtual skeleton. In some implementations, the methods and systems eliminate one or more virtual skeletal joints and/or virtual skeletal segments associated with the master virtual skeleton to provide the virtual skeleton adapted based on the capability profile. For example, the disclosed methods and systems may eliminate one or more joints associated with the hands of the master virtual skeleton in providing the virtual skeleton adapted based on the capability profile.

In another example, the disclosed methods and systems may eliminate leg segments (e.g., foot segments, lower leg segments, upper leg segments, etc.) of the master virtual skeleton based on the capability profile. In yet another example, the disclosed methods and systems may eliminate the virtual skeletal segments associated with the torso, legs, and feet to provide an adapted virtual skeleton that includes only the virtual had segments, arm segments and hand segments.

An adapted virtual skeleton based on a capability profile may be requested by a client device coupled to an adaptive avatar platform that is associated with a distributed computing network, such as a cloud-based system. The adaptive avatar platform may be functional, as described in the foregoing, to provide adapted virtual skeletons based on capability profiles. In some implementations, a client device may incorporate an adaptive avatar platform that is functional to provide adapted virtual skeletons based on capability profiles.

In some implementations, a computer implemented method is provided. The computer implemented method may be implemented by an adaptive avatar platform associated with a server or a computing device associated with a distributed computing network. The method may include analyzing, by a computing device, a capability profile comprising information usable by the computing device to adapt a virtual skeleton stored in a computer storage, and retrieving, by the computing device, the virtual skeleton stored in the computer storage. The method may further include adapting, by the computing device, the virtual skeleton based on the information comprised in the capability profile, the adapting by the computing device comprising reducing complexity of the virtual skeleton based on the information comprised in the capability profile and generating an adapted virtual skeleton. Furthermore, the method may include storing, by the computing device, the adapted virtual skeleton.

In some implementations, a computer implemented method is provided. The computer implemented method may be implemented by a client computing device coupled to an adaptive avatar platform. The adaptive avatar platform may be associated with a server, a cloud-based computing device, or the client computing device. The method may include providing a capability profile comprising information usable to adapt a virtual skeleton stored in a computer storage. Furthermore, the method may include receiving an adapted virtual skeleton derived from the virtual skeleton stored in the computer storage, the adapted virtual skeleton having a virtual skeletal complexity being less complex than a virtual skeletal complexity of the virtual skeleton stored in the computer storage, the adapted virtual skeleton generated based on the information comprised in the capability profile. The method may store the adapted virtual skeleton in a computer storage.

In some implementations, a computing device may be provided that includes a processor. The computing device may further incorporate computer-readable storage medium in communication with the processor, the computer-readable storage medium having computer-executable instructions stored thereupon which, when executed by the processor, cause the processor to analyze a capability profile comprising information usable by the computing device to adapt a virtual skeleton stored in a computer storage, and retrieve the virtual skeleton stored in the computer storage. Furthermore, the computer-executable instructions, when executed by the processor, may cause the processor to adapt the virtual skeleton based on the information comprised in the capability profile, the adapting comprising reducing complexity of the virtual skeleton based on the information comprised in the capability profile, and generating an adapted virtual skeleton. Furthermore, the computer-executable instructions, when executed by the processor, may cause the processor to store the adapted virtual skeleton.

In some implementations, the adapted virtual skeleton is a modified version of a master virtual skeleton or a high fidelity virtual skeleton stored in a storage associated with a computing device and generated based on a capability profile associated with a computing device. While in some implementations, the adapted virtual skeleton is a new virtual skeleton generated based on a capability profile associated with a computing device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

FIG. 8 illustrates a computer architecture diagram illustrating an illustrative hardware and software architecture for a computing system capable of implementing aspects of the techniques and technologies presented herein.

DETAILED DESCRIPTION

Figure 1:
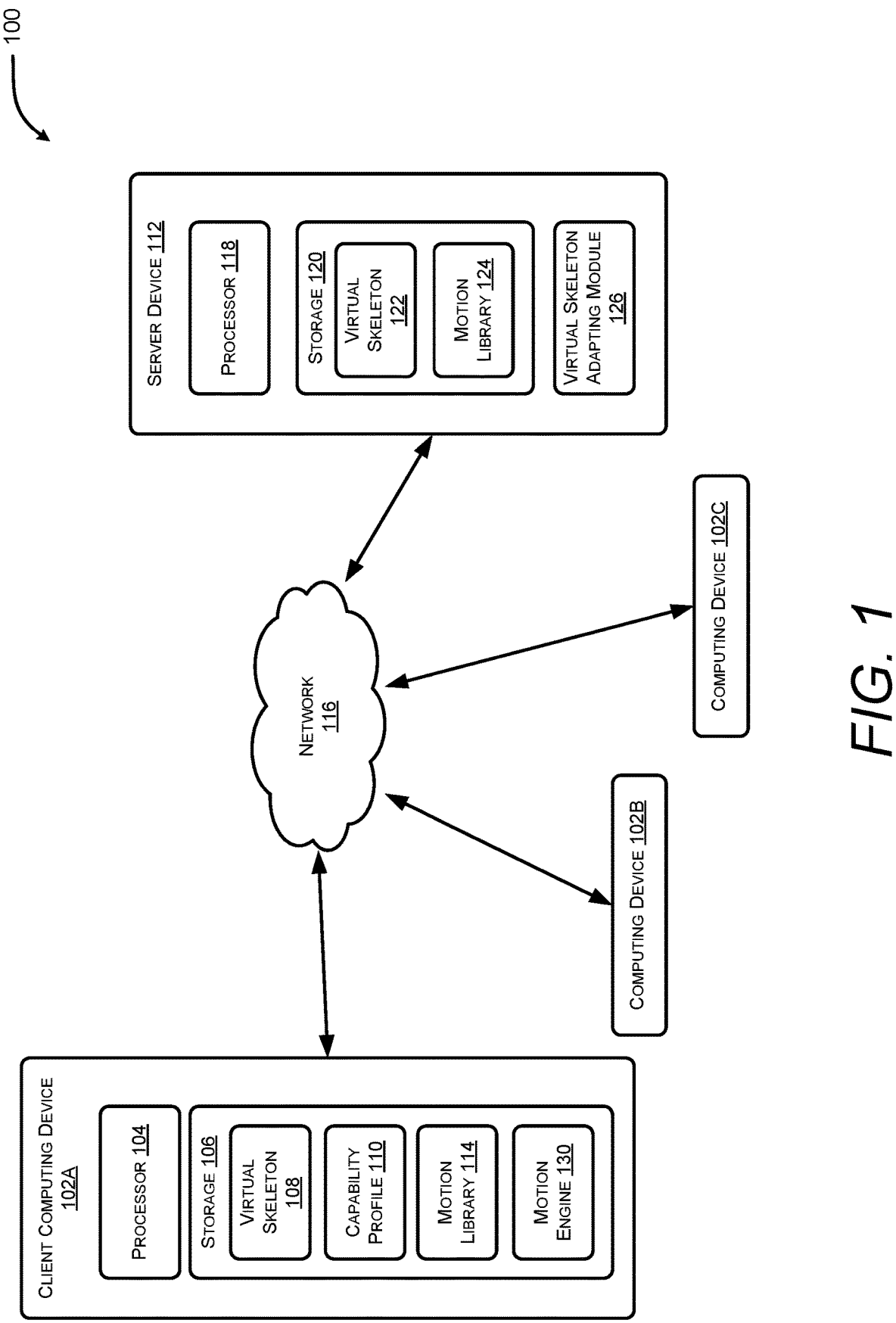
FIG. 1 is a block diagram illustrating an example computing environment that may include computing devices associated with providing and receiving virtual skeletons. In some implementations, the virtual skeletons are adapted based on capability profiles.

At least some of the disclosed methods and systems provide a virtual skeleton adapted based on a capability profile. In some implementations, the virtual skeleton adapted based on a capability profile is generated from a master virtual skeleton. The adapted virtual skeleton may be less complex than the master virtual skeleton. Specifically, the adapted virtual skeleton may include fewer virtual skeletal joints than a number of virtual skeletal joints associated with the master virtual skeleton.

The use of virtual skeletons adapted to the capabilities of computing devices greatly reduces the processor and graphic loads required to render virtual skeletons on displays associated with the computing devices. Reduction of unnecessary processor overhead reduces battery drain and lowers unnecessary memory use associated with computing devices. Other technical benefits not specifically identified herein can also be realized through implementations disclosed in the following.

In some implementations, the capability profile may include a hardware profile associated with a computing device that is to use an adapted virtual skeleton. The hardware profile may set forth one or more functional capabilities (e.g., processor power, storage capability, etc.) associated with the computing device. The hardware profile may further specify if the computing device includes a head tracking system, camera, voice recognition system, body movement sensors (e.g., kinetic sensors), eye gaze detection system, finger tracking devices, activity determination system (e.g., walking, exercising, etc.) finger following camera, and the like, and combinations of the same.

The disclosed methods and systems may analyze the particulars associated with the capability profile to determine a manner in which to adapt the master virtual skeleton. In some implementations, the methods and systems eliminate one or more virtual skeletal joints and/or virtual skeletal segments associated with the master virtual skeleton to provide the virtual skeleton adapted based on the capability profile. For example, the disclosed methods and systems may eliminate one or more joints associated with the hands of the master virtual skeleton in providing the virtual skeleton adapted based on the capability profile. In another example, the disclosed methods and systems may eliminate leg segments (e.g., foot segments, lower leg segments, upper leg segments, etc.) of the master virtual skeleton based on the capability profile. In yet another example, the disclosed methods and systems may eliminate the virtual skeletal segments associated with the torso, legs, and feet to provide an adapted virtual skeleton that includes only the virtual head segments, arm segments and hand segments.

An adapted virtual skeleton based on a capability profile may be requested by a client device coupled to an adaptive avatar platform that is associated with a distributed computing network. The adaptive avatar platform may be functional, as described in the foregoing, to provide adapted virtual skeletons based on capability profiles. In some implementations, a client device may incorporate an adaptive avatar platform that is functional to provide adapted virtual skeletons based on capability profiles.

Various examples, implementations, scenarios, and aspects are described below with reference to FIGS. 1 through 8.

Before describing a method for obtaining a virtual skeleton adapted based on a capability profile, an example of a suitable use environment is described with reference to FIG. 1, which shows an example computing device environment 100. The example computing device environment 100 may be associated with a single computing device or a plurality of unnetworked computing devices (not illustrated in FIG. 1). Also, the example computing device environment 100 may be part of a distributed computing network, such as a cloud-based computing environment and/or a networked computing environment that includes one or more servers and one or more computing devices coupled to the one or more servers.

The environment 100 comprises a client computing device 102A. The environment 100 may comprise additional client computing devices 102B and 102C. The additional client computing devices 102B and 102C may function and include the same elements as the client computing device 102A. Therefore, additional description related to the additional client computing devices 102B and 102C is not provided herein.

The client computing device 102A may include a processor 104. The processor 104 may be coupled to a storage 106. In some implementations, the processor 104 is functional to execute computer-executable instructions (not illustrated in FIG. 1) that may be included in the storage 106.

The storage 106 may further include one or more virtual skeletons 108. Furthermore, the storage 106 may include a capability profile 110. The virtual skeleton 108 may have been adapted based on particular attributes associated with the capability profile 110. Specifically, the client computing device 102A may transmit the capability profile 110 to a server device 112 by way of a network 116. The network 116 may represent any suitable network or combinations of networks, including but not limited to public and/or private local area networks, and/or public and/or private wide area networks, including but not limited to the Internet.

The server device 112 may analyze attributes associated with the capability profile 110, and communicate the virtual skeleton 108 to the computing device 102A. In some implementations, the communicated virtual skeleton 108 is adapted based on attributes associated with the capability profile 110. Further details related to the capability profile 110 and the virtual skeleton 108 are provided below.

In some implementations, the storage 106 includes a motion library 114. Similar to the virtual skeleton 108, the motion library 114 may have been received from the server device 112. In some implementations, the motion library 114 defines one or more motion behaviors associated with the virtual skeleton 108. For example, the motion library 114 may include details related how the one or more skeletal joints associated with the virtual skeleton 108 are to move. Furthermore, the motion library 114 may include details related to how the one or more virtual skeletal segments (e.g., leg segments, arm segments, finger segments, etc.) are to move. A motion engine 130 may be provided to interact with the motion library 114 to enable movement of the virtual skeleton 108 in accordance with the virtual skeleton movement details associated with the motion library 114.

In some implementations, the motion library 114 is provided by the server device 112 in connection with providing the virtual skeleton 108. For example, the motion library 114 may include details related to the movement of one or more virtual skeletal joints and/or virtual skeletal segments associated with the virtual skeleton 118 having been adapted by the server device 112.

The server device 112 may likewise include a processor 118 and a storage 120. Among other things, the storage 120 may include a virtual skeleton 122. In some implementations, the virtual skeleton 122 is a master virtual skeleton that the server device 112 may adapt based on the capability profile 110 received from the computing device 102A. Specifically, the server device 112 may receive the capability profile 110 from the computing device 102A. In response, the server device 112 may adapt the virtual skeleton 122 to provide the virtual skeleton 108. In some implementations, the adapted virtual skeleton 108 is less complex than the virtual skeleton 122. For example, the virtual skeleton 108 may comprise fewer virtual skeletal joints and/or virtual skeletal segments than the virtual skeleton 122. In some implementations, the virtual skeleton 108 may comprises fewer virtual skeletal joint parameters (e.g., Cartesian coordinates) than a number of virtual skeletal joint parameters associated with the virtual skeleton 122.

In some implementations, the virtual skeleton 122 is generated in response to receiving the capability profile 110. Subsequently, the virtual skeleton 122 may be adapted based on attributes associated with the capability profile 110 to generate the adapted virtual skeleton 108. In some implementations, the adapted virtual skeleton 108 replaces the virtual skeleton 122. Alternatively, in some implementation, the virtual skeleton 122 is maintained after the generation of the adapted virtual skeleton 108. The virtual skeleton 122 and/or the virtual skeleton 108 may be stored in one or more computer storages.

A data structure, such as one or more computer files, comprising the adapted virtual skeleton 108 may consume less storage space than the data structure comprising the virtual skeleton 122. The data structures may include data defining the virtual skeleton 108 and/or the virtual skeleton 122. Therefore, transmission of the virtual skeleton 108 to the client computing device 102A may consume less network bandwidth compared to if the virtual skeleton 122 were to be transmitted to the client computing device 102A.

The storage 120, associated with the server device 112, may also include a motion library 124. The motion library 124 may include details related to the movement of one or more virtual skeletal joints and/or virtual skeletal segments associated with the virtual skeleton 122. The server device 112 may use the motion library 124 as a basis, in some implementations, for generating and providing the motion library 114. Specifically, as described, the server device 112 may adapt the virtual skeleton 122, based on the capability profile 110, to provide the virtual skeleton 118 to the client computing device 102A. The server device 112 may similarly adapt the motion library 124 to generate the motion library 114. Specifically, in generating the motion library 114, the server device 112 may adapt the motion library 124 to include details related to the movement of one or more virtual skeletal joints and/or virtual skeletal segments consistent with the virtual skeletal joints and/or virtual skeletal segments associated with the virtual skeleton 108.

The server 112 may further include a virtual skeleton adapting module 126. The processor 118 may be functional to control the virtual skeleton adapting module 126. For example, the processor 118 may invoke the functionality of the virtual skeleton adapting module 126 upon receiving the capability profile 110 from the client computing device 102A. The virtual skeleton adapting module 126 may be controlled by the processor 118 to analyze the capability profile 110. In response to the analysis performed by the virtual skeleton adapting module 126, the virtual skeleton adapting module 126 may adapt the virtual skeleton 122 to generate the virtual skeleton 108. The server 112 may then communicate the virtual skeleton 108 to the computing device 102A.

Figure 2:
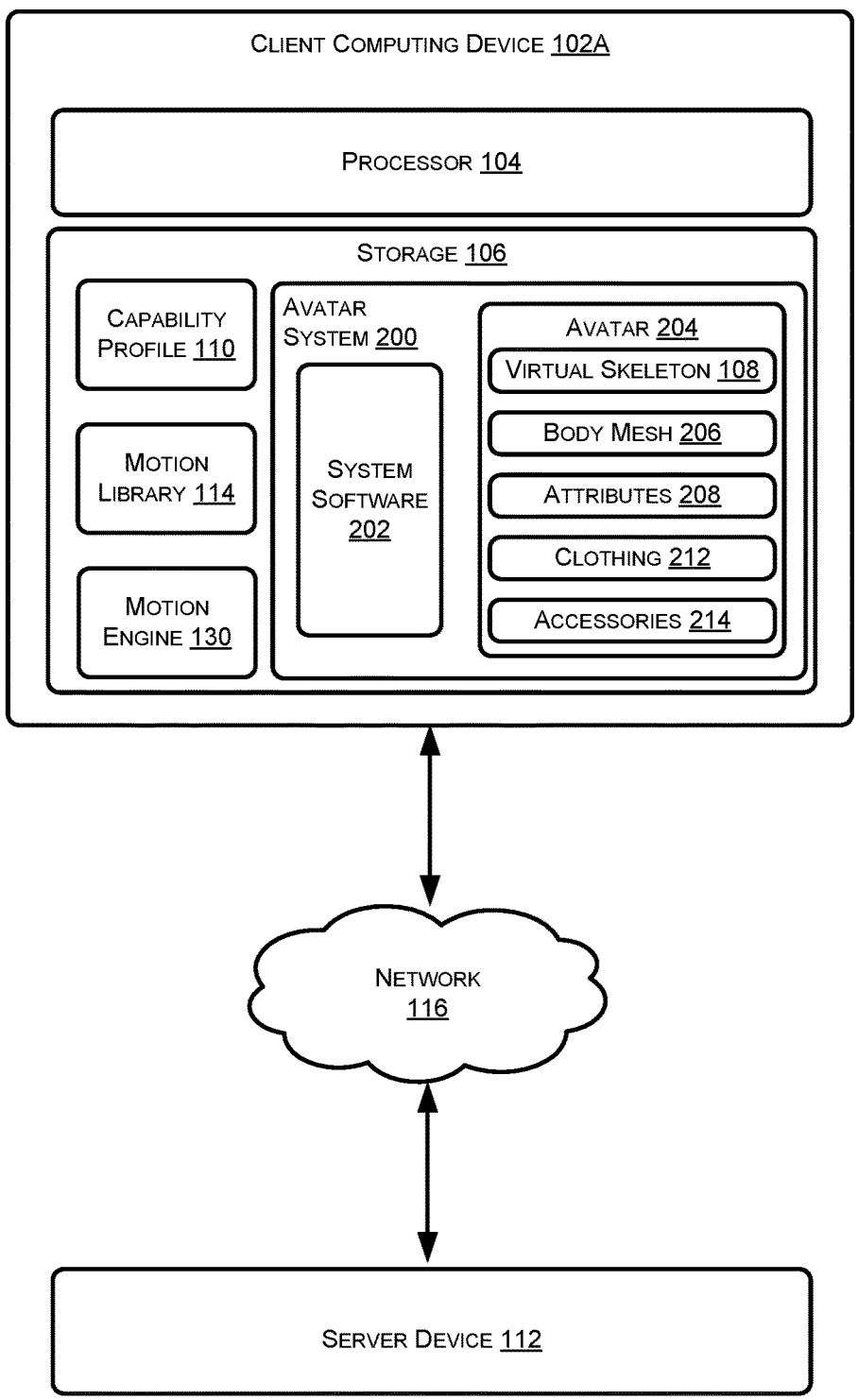
FIG. 2 is a block diagram providing additional details of a client computing device, such as the client computing device illustrated in FIG. 1.

FIG. 2 illustrates additional details and functionalities associated with the client computing device 102A. The client computing device 102A may include an avatar system 200 and system software 202. The avatar system 200 may generate an avatar 204 that represents a user in any of a variety of contexts, including, for example, video games, chat or instant messaging applications, forums, communities, the XBOX LIVE® service and/or other computer implemented applications.

The avatar system 200 may include the virtual skeleton 108. The virtual skeleton, as discussed in the foregoing, may have been received from the server device 112 in accordance with the capability profile 110 of the client computing device 102A. Furthermore, the avatar system 200 may generate a deformable body mesh 206, a set of attributes 208 specifying the appearance of the face and/or body of the avatar 204, and a basic set of avatar items, such as avatar clothing 212 and avatar accessories 214. This information may be stored as data in the system software 202 associated with the avatar system 200.

The virtual skeleton 108 may allow avatar computing applications, such as applications that are designed to incorporate avatars in the context of the instant messaging application, or the like, to move parts of the virtual skeleton 108 at well-defined virtual skeletal joints or pivot points. Such avatar computing applications can animate any avatar with knowledge of virtual skeleton 108, and in some cases the motion library 114, and without any other specific knowledge about the appearance of the avatar 204.

The avatar system 200 may generate or maintain the body mesh 206 that defines the form of the avatar 204, e.g., the height of the avatar 204 and whether the avatar 204 is of a slim, average, or muscular build. The avatar system 200 may also generate or maintain a set of attributes 208 relating to the appearance of the face or body, or both, of the avatar 204. For example, the avatar system 200 may maintain a set of attributes that describe certain aspects of the avatar's face, such as eye color, hair style, coloration, etc.

In some implementations, the avatar system 200 generates or maintains a set of avatar items, such as the clothing 212 and the accessories 214, that can be applied to the avatar 204. In some implementations, the avatar 204 may have handbags, sunglasses, hats, jewelry, and the like. It will be understood that, in some embodiments, the set of avatar items, such as the closing 112 and/or the accessories 214, may be stored in one or more data structures as data, such as one or more computer readable files including data comprising the avatar items.

Figure 3:
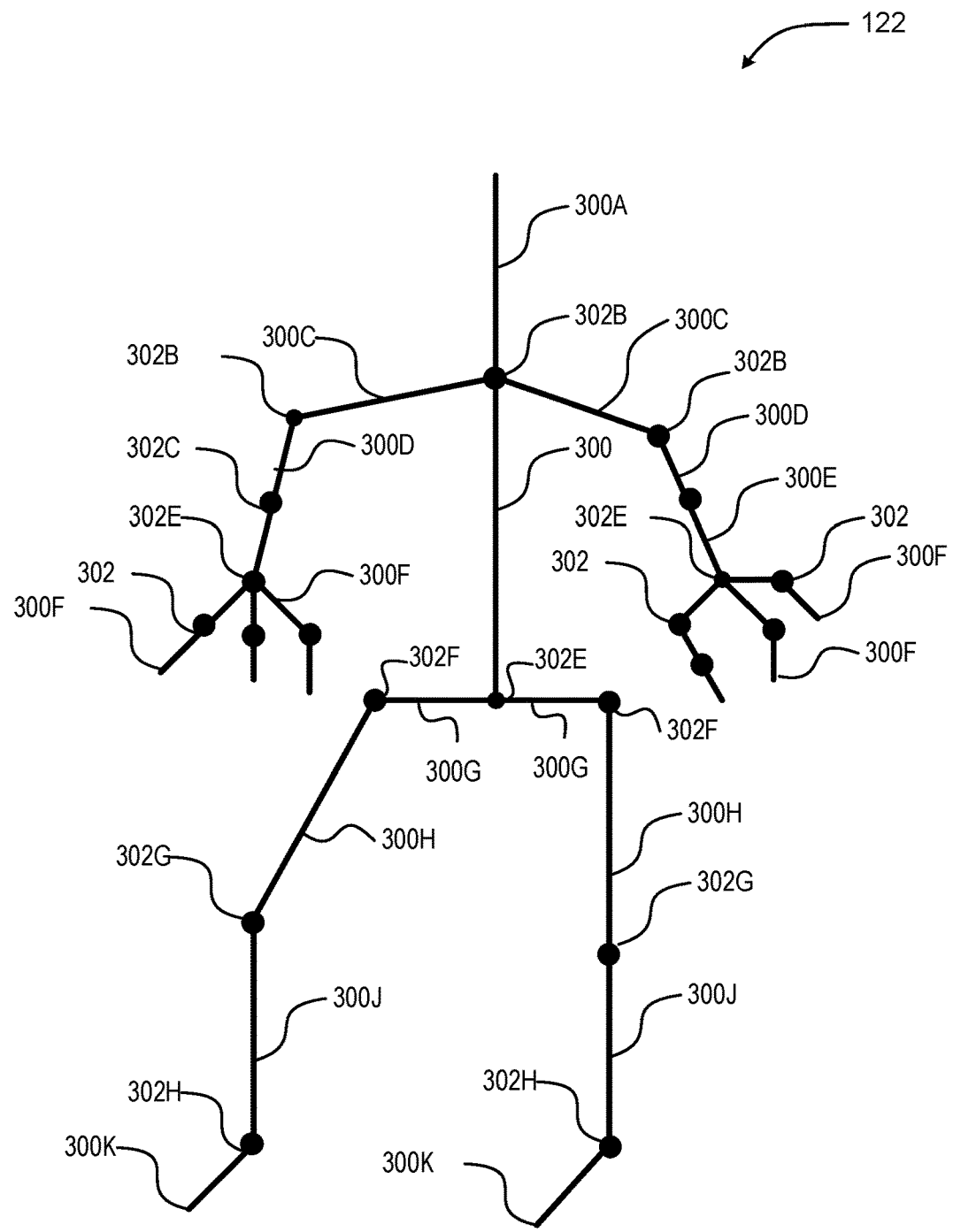
FIG. 3 is a diagram illustrating a virtual skeleton that may be associated with an avatar mesh.

FIG. 3 illustrates an exemplary implementation of the virtual skeleton 122 associated with the server device 112. The virtual skeleton includes a plurality of virtual skeletal segments 300 pivotally coupled at a plurality of virtual skeletal joints 302. In some implementations, a body-part designation may be assigned to each virtual skeletal segment and/or each virtual skeletal joint.

In FIG. 3, the body-part designation of each virtual skeletal segment 300 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each virtual skeletal joint 302 is represented by an appended letter: A for the neck, B for the shoulder, C for the elbow, D for the wrist, E for the lower back, F for the hip, G for the knee, and H for the ankle.

For reasons related to illustrating simplicity, some of the virtual skeletal segments 300 and the virtual skeletal joints 302 are not labeled with a reference number. Naturally, the arrangement of virtual skeletal segments 300 and virtual skeletal joints 302 shown in FIG. 3 is in no way limiting. A virtual skeleton consistent with this disclosure may include virtually any type and number of virtual skeletal segments and virtual skeletal joints.

In some implementations, each virtual skeletal joint 302 may be assigned various parameters—e.g., Cartesian coordinates specifying joint position, angles specifying joint rotation, and additional parameters specifying a conformation of the corresponding body part (hand open, hand closed, etc.). The virtual skeleton 122 may take the form of one or more data structures including any or all of these parameters for each virtual skeletal joint 302 and the associated virtual skeletal segments 300 and the data defining the parameters. For example, the one or more data structures may include the virtual skeleton 122 and the motion library 124 associated with the storage 120. In this manner, the metrical data defining the virtual skeleton 122—its size, shape, orientation, position, etc.—may be assigned to the virtual skeletal segments 300 and/or the virtual skeletal joints 302.

Figure 4:
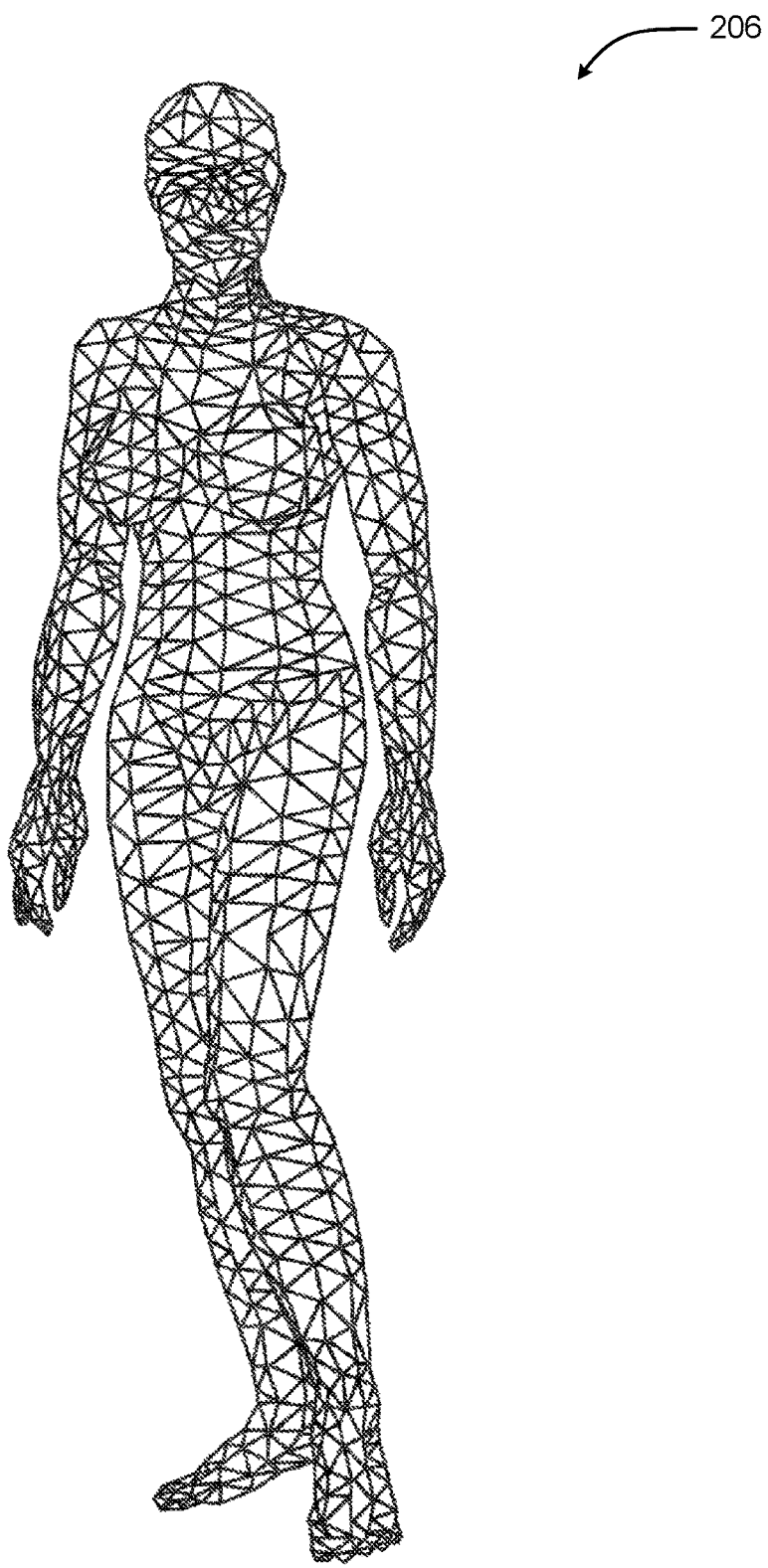
FIG. 4 illustrates an exemplary avatar mesh. The exemplary avatar mesh and the virtual skeleton may function cooperatively to enable movement of an avatar.

As described, the client computing device 102A may include a body mesh 206. An exemplary body mesh 206 is illustrated in FIG. 4. The body mesh 206 may take the form of one or more data structures including any or all body mesh particulars described below.

The body mesh 206 may be associated with the virtual skeleton 108. As illustrated, the body mesh 206 may be a wireframe mesh, which may include hierarchies of rigid polygonal meshes (e.g. triangles), one or more deformable meshes, or any combination of the two arranged in a mesh that defines the shape of a body model. Such a mesh may include bending limits at each polygonal edge. In other examples, some models may include patches, non-uniform rotation B-splines, or other higher-order surfaces. A model may also include surface textures and/or other information to more accurately represent clothing, hair, and/or other aspects of a modeled target, such as included in the attributes 208, clothing 212, and/or accessories 214.

Figure 5:
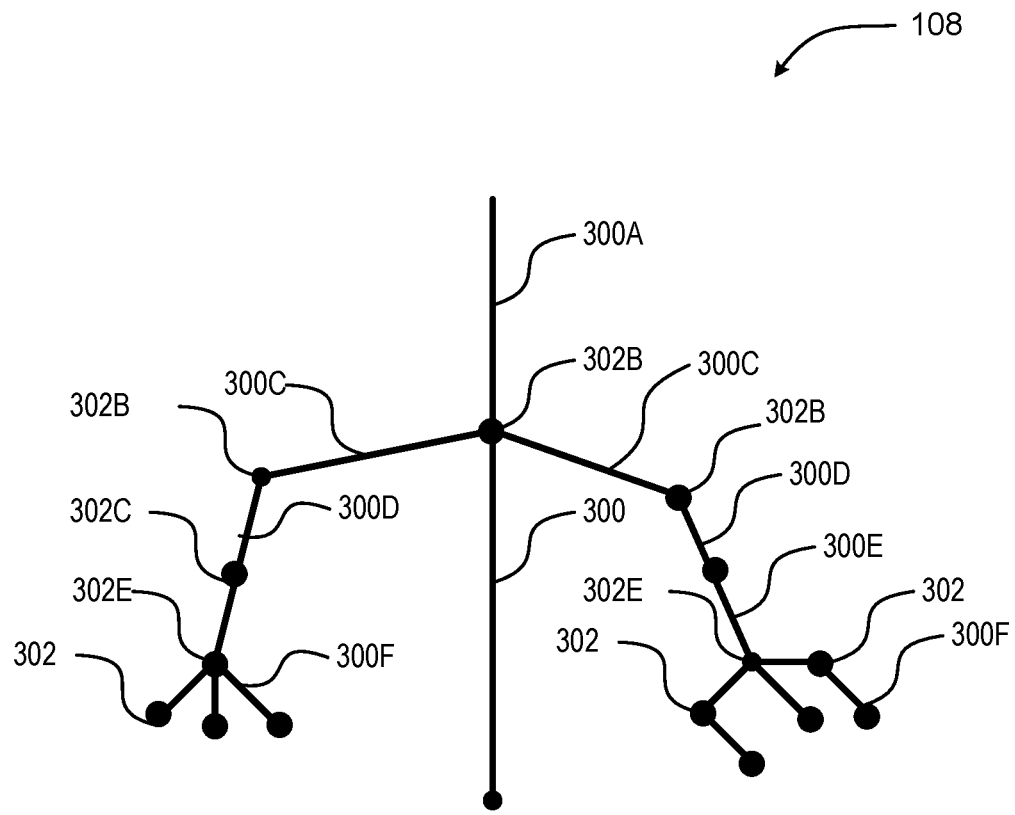
FIG. 5 illustrates an exemplary augmented virtual skeleton. The augmented virtual skeleton may be generated based on a capability profile provided by a computing device.

FIG. 5 illustrates an adapted virtual skeleton 108 in accordance with an exemplary implementation. The virtual skeleton 108 may be provided by the server device 112 based on the capability profile 110, which was provided by the computing device 102A to the server device 112 over the network 116. The virtual skeleton 108, as clearly seen in FIG. 5, is less complex than the virtual skeleton 122 (see FIG. 3).

The server device 112 may decide to provide the virtual skeleton 108, having reduced complexity, based on the capability profile 110. Specifically, in some implementations, the capability profile 110 provides a hardware capability profile of the client computing device 102A. The hardware capability profile associated with the capability profile 110 may serve as a basis for reducing the complexity of the virtual skeleton 102 to generate the virtual skeleton 108. Naturally, the arrangement and number of virtual skeletal segments 300 and virtual skeletal joints 302 of the virtual skeleton 108, shown in FIG. 5, are in no way limiting.

In some implementations, the capability profile 110 may indicate a hardware resource level (e.g., low, medium, or high) of the client computing device 102A. A low hardware resource level may indicate minimal processing and/or graphic capabilities associated with the computing device 102A. A medium hardware resource level may indicate moderate processing and/or graphic capabilities, and a high hardware resource level may indicate excellent processing and/or graphic capabilities. The server device 112 may eliminate a higher number of the virtual skeletal joints and/or virtual skeletal segments and associated parameters of the virtual skeleton 122 when providing the adapted virtual skeleton 108 to a computing device having a low hardware resource level.

On the other hand, a capability profile 110 indicating a high hardware resource level may trigger the server device 112 to minimally reduce the complexity (e.g., reduce virtual skeletal joints and/or virtual skeletal segments and associated parameters) of the virtual skeleton 122 when generating and providing the adapted virtual skeleton 108 to the client computing device 102A. In some implementations, the server device 112 may simply provide the virtual skeleton 122 to the client computing device that has a capability profile 110 indicating a high hardware resource level.

In some implementations, the capability profile 110 may define the motion tracking capabilities associated with the avatar system 200 of the client computing device 102A. In particular, the capability profile 110 may indicate if the avatar system 200 is able to monitor head position, head rotation, eye and/or gaze tracking, hand tracking, finger tracking, and the like.

Some avatar systems 200 associated with client computing devices may include motion tracking sensors, such as optical motion tracking sensors, body and head controllers, eye controllers, eye tracking recognition technology using one or more cameras, optical sensors, data receivers, motion artificial intelligence, and other electronic hardware. Therefore, the avatar system 200 may be configured to cause the avatar 204 and the underlying virtual skeleton 108 to move and behave in a manner similar to the movements and behaviors associated with a user of the client computing device 102A.

A camera and/or other sensors associated with the avatar system 200 may be used for motion tracking of a user of the client computing device 102A, such as detecting user positions and movements, and generating signals defining virtual skeleton parameters, such as x, y and z Cartesian coordinates (e.g., parameters for virtual skeletal joints and segments). For example, the camera and/or other sensors may be used to implement tracking recognition techniques to collect tracking recognition data. As an example, the tracking data may relate to a user's eye movements.

The server device 112 may eliminate a higher number of the virtual skeletal joints and/or virtual skeletal segments associated with the virtual skeleton 122 when providing the adapted virtual skeleton 108 to a computing device having limited or minimal motion tracking capabilities associated with the avatar system 200 of the client computing device 102A. The limited or minimal motion tracking capabilities may be included in a capability profile 110 belonging to the computing device 102A. On the other hand, a capability profile 110 indicating robust motion tracking capabilities associated with the avatar system 200 of the client computing device 102A may trigger the server device 112 to minimally reduce the complexity (e.g., reduce virtual skeletal joints and/or virtual skeletal segments and associated parameters) of the virtual skeleton 122 when generating and providing the adapted virtual skeleton 108 to the client computing device 102A.

Figure 6:
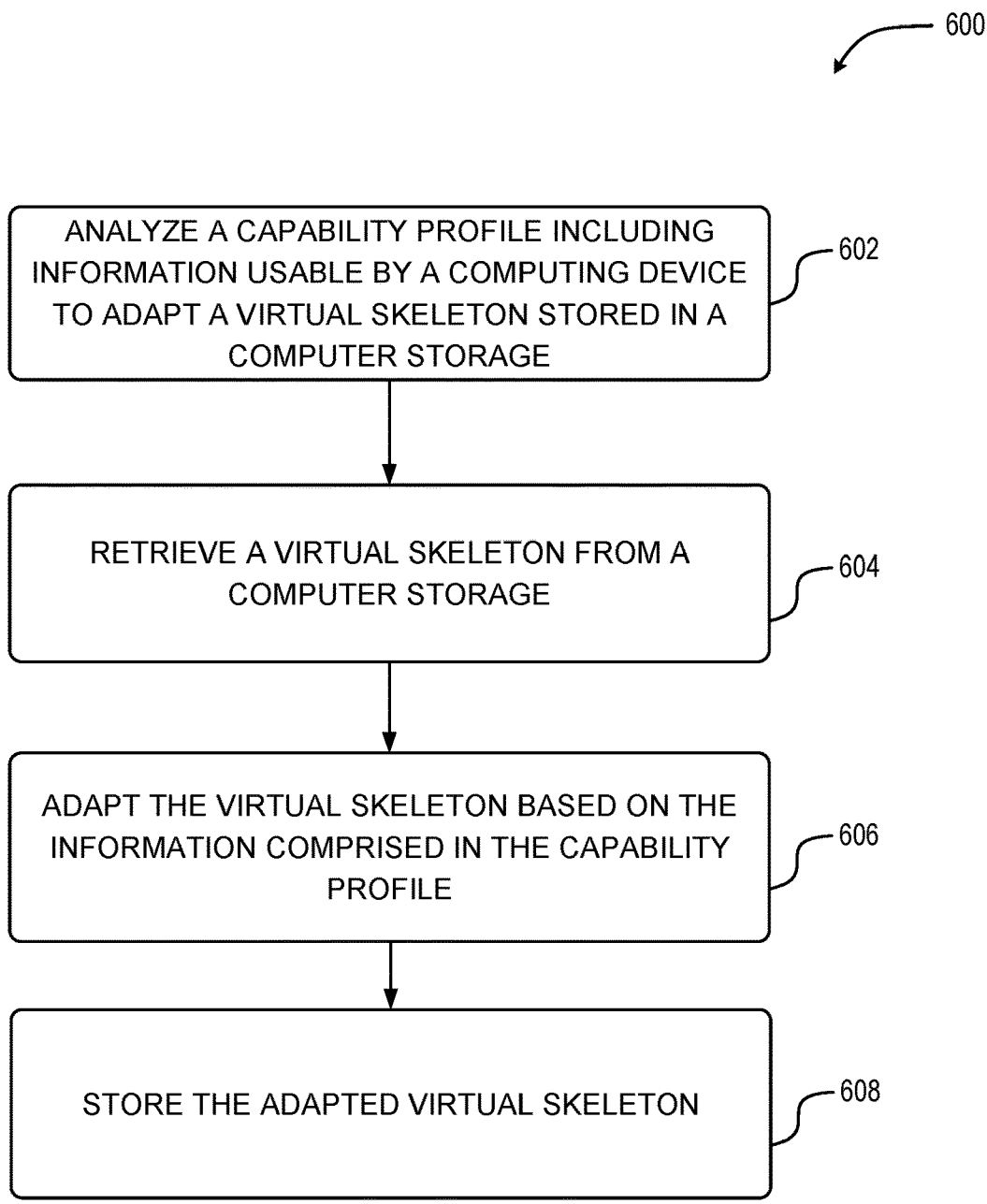
FIGS. 6-7 illustrate flowchart diagrams relating to operations for providing, receiving, analyzing and/or generating virtual skeletons and/or adapted virtual skeletons.
Figure 7:
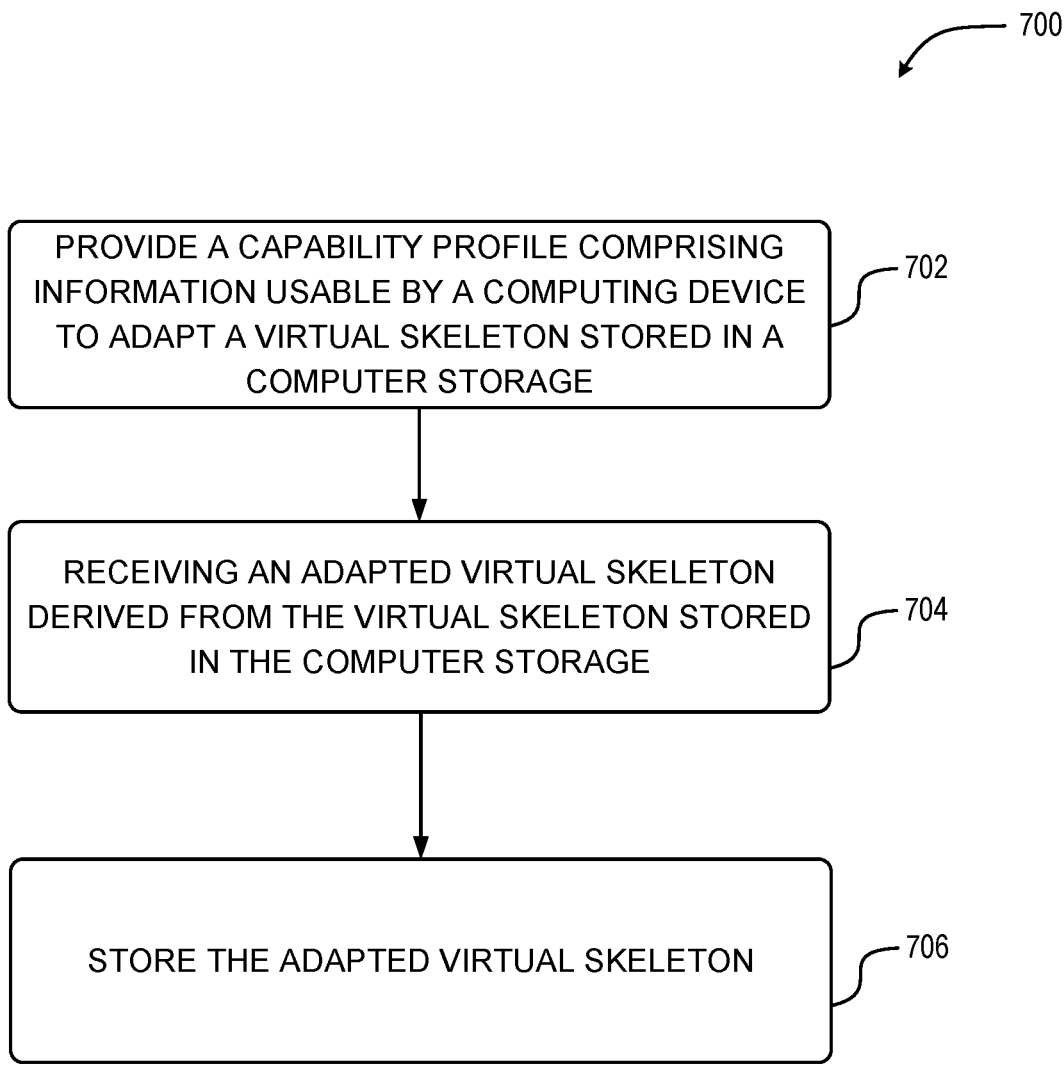

FIGS. 6 and 7 illustrate example flowcharts. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., the computing devices 102A, 102B, 102C, 112, or a plurality of computing devices) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Furthermore, the logical operations described herein may be implemented by a single computing device, such as a client device or a server device. Alternatively, the logical operations described herein may be implemented by a combination of server devices and client devices.

FIG. 6 is a diagram of an example flowchart 600 that illustrates operations associated with providing an adapted virtual skeleton based on a capability profile. In one example, the operations of FIG. 6 can be performed by components of one or more computing devices, such as the computing server device 112 and/or the client computing device 102A. Therefore, the instructions associated with the example flowchart 700 may be executed by one or more processors associated with server-side components and/or client-side components.

At operation 602, a capability profile comprising information usable by a computing device to adapt a virtual skeleton stored in a computer storage is analyzed. In some implementations, the analysis may be performed by the virtual skeleton adapting module 126. Specifically, the virtual skeleton adapting module 126 may analyze the capability profile 110 to generate the virtual skeleton 108, which is an adapted version of the virtual skeleton 122.

At operation 604, a virtual skeleton stored in a computer storage is retrieved. The retrieved virtual skeleton may be the virtual skeleton 122.

At operation 606, the retrieved virtual skeleton stored in the computer storage is adapted based on the information comprising the capability profile. The adapting may include reducing a complexity of the virtual skeleton 122 based on the information in the capability profile, and generating an adapted virtual skeleton, such as the virtual skeleton 108.

At operation 608, the adapted virtual skeleton is stored in a computer storage. For example, the adapted virtual skeleton may be stored in the storage 120 and/or the storage 106.

FIG. 7 is a diagram of an example flowchart 700 that illustrates operations associated with receiving an adapted virtual skeleton based on a capability profile. In one example, the operations of FIG. 7 can be performed by components of one or more computing devices, such as the computing server device 112 or the client computing device 102A. Therefore, the instructions associated with the example flowchart 700 may be executed by one or more processors associated with server-side components and/or client-side components.

At operation 702, a capability profile comprising information usable by a computing device to an adapt a virtual skeleton stored in a computer storage is provided. In some implementations, providing the capability profile comprises transmitting the capability profile from the client computing device 102A to the server device 112.

At operation 704, an adapted virtual skeleton derived from the virtual skeleton stored in the computer storage is received. In some implementations, the client computing device 102A receives the adapted virtual skeleton. Furthermore, in some implementations, the adapted virtual skeleton may be generated from a virtual skeleton stored in the server device 112. The adapted virtual skeleton may be a less complex version of the virtual skeleton stored in the server device 112. In some implementations, the adapted virtual skeleton includes fewer virtual skeletal joints and/or virtual skeletal segments then the virtual skeletal joints and/or virtual skeletal segments associated with the virtual skeleton stored in the server device 112.

At operation 706, the adapted virtual skeleton is stored in a computer storage. For example, the adapted virtual skeleton may be stored in the storage 120 and/or the storage 106.

Turning now to FIG. 8, an illustrative computing device architecture 800 for computing devices that are capable of executing various software components is described herein. The computing device architecture 800 is applicable to computing devices that facilitate mobile computing due, in part, to form factor, wireless connectivity, and/or battery-powered operation. In some configurations, the computing devices include, but are not limited to, digital pens, digital inking devices, mobile telephones, tablet devices, slate devices, portable video game devices, and the like.

The computing device architecture 800 is applicable to any of the computing devices shown in the accompanying figures. Moreover, aspects of the computing device architecture 800 may be applicable to traditional desktop computers, portable computers, e.g., phones, laptops, notebooks, ultra-portables, and netbooks, server computers, and other computer systems, such as described herein. For example, the single touch and multi-touch aspects disclosed herein below may be applied to desktop computers that utilize a touchscreen or some other touch-enabled device, such as a touch-enabled track pad or touch-enabled mouse. In some implementations, some or all of the computer device architecture 800 is implemented by the computing devices 102A, 102B, 102C and/or 112.

The computing device 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") (not shown) configured to accelerate operations performed by the CPU, including, but not limited to, operations performed by executing general-purpose scientific and/or engineering computing applications, as well as graphics-intensive computing applications such as high-resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") (not shown) along with one or more of the other components described herein below. For example, the SoC may include the processor 802, a GPU, one or more of the network connectivity components 806, and one or more of the sensor components 808. In some configurations, the processor 802 is fabricated in part utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom.

Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a computer readable medium ("CRM") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the CRM 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The computer-readable media (CRM) 820 can include a solid-state memory, a hard disk, or a combination of solid-state memory and a hard disk. In some configurations, the CRM 820 is provided in lieu of the integrated storage 818. In other configurations, the CRM 820 is provided as additional optional storage. In some configurations, the CRM 820 is logically combined with the integrated storage 818 such that the total available storage is made available as a total combined storage capacity. In some configurations, the total combined capacity of the integrated storage 818 and the CRM 820 is shown to a user instead of separate storage capacities for the integrated storage 818 and the removable storage 820.

As used herein, computer-readable media can store instructions executable by the processing unit(s) 802. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. The claimed subject matter may be embodied in other ways, may include different elements or operations, and may be used in conjunction with other existing or future technologies. This description should not be interpreted as implying any particular order or arrangement among or between various operations or elements except when the order of individual operations or arrangement of elements is explicitly described.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the networks referred to in any description herein. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that is functioning as a WI-FI hotspot. The WLAN component 824 is configured to connect to the network 856 via the WI-FI access points. Such connections may be secured via various encryption technologies including, but not limited to, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN. For instance, all digital inking devices 100 disclosed herein can be in communication with a paired computer 101 via a BLUETOOTH connection, a WI-FI connection, WI-FI DIRECT connection, etc.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity information as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interfaces described below, or may include processing functionality built-in to the processor 802.

In some configurations, the computing device 800 can include feedback device 851, such as an actuator or solid-state circuit configured to physically vibrate in response to a haptic signal. The processing units can cause the generation of a haptic signal associated with a generated haptic effect to feedback device 851, which in turn outputs haptic effects such as vibrotactile haptic effects, electrostatic friction haptic effects, or deformation haptic effects.

The feedback device 851 includes a drive circuit. The feedback device 851 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, computing device 800 can include one or more feedback devices 851.

The feedback device 851 is an example of a haptic output device, where a haptic output device is a device configured to output haptic effects, such as vibrotactile haptic effects, electrostatic friction haptic effects, or deformation haptic effects, in response to a drive signal. In alternate embodiments, the feedback device 851 can be replaced by some other type of haptic output device. Further, in other alternate embodiments, computing device 800 may not include an actuator, and a separate device from the computing device 800 includes an actuator, or other haptic output device, that generates the haptic effects, and computing device 800 sends generated haptic signals to that device through a communication device.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology.

In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

Example Clauses

The disclosure presented herein encompasses the subject matter set forth in the following clauses.

Clause 1. A computer implemented method, comprising: analyzing, by a computing device, a capability profile comprising information usable by the computing device to adapt data defining a virtual skeleton stored in a computer storage; retrieving, by the computing device, the data defining the virtual skeleton stored in the computer storage; adapting, by the computing device, the data defining the virtual skeleton based on the information comprised in the capability profile, the adapting by the computing device comprising reducing a complexity of the data defining the virtual skeleton based on the information comprised in the capability profile, and generating adapted data defining an adapted virtual skeleton; and storing, by the computing device, the adapted virtual skeleton.

Clause 2. The computer implemented method according to clause 1, further comprising receiving the capability profile from a computing device coupled to the computing device to adapt the virtual skeleton stored in the computer storage.

Clause 3. The computer implemented method according to at least one of clauses 1-2, wherein the computing device to adapt the data defining the virtual skeleton stored in the computer storage is part of a distributed computer network.

Clause 4. The computer implemented method according to at least one of clauses 1-3, wherein the virtual skeleton stored in the computer storage comprises data defining a plurality of virtual skeletal joints each having an associated plurality of parameters, and wherein reducing complexity of the data defining the virtual skeleton based on the information comprised in the capability profile comprises eliminating a plurality of parameters associated with data defining at least one of the plurality of virtual skeletal joints.

Clause 5. The computer implemented method according to clause 4, wherein the eliminated plurality of parameters associated with the data defining the at least one of the plurality of virtual skeletal joints comprises at least Cartesian coordinates specifying a position of the at least one of the plurality of virtual skeletal joints associated with the data defining the virtual skeleton stored in computer storage.

Clause 6. The computer implemented method according to at least one of clauses 1-5, wherein generating the data defining the adapted virtual skeleton comprises associating the data defining the adapted virtual skeleton with a data structure comprising at least parameters defining each virtual skeletal joint associated with the adapted virtual skeleton.

Clause 7. The computer implemented method according to clause 6, wherein the parameters defining each virtual skeletal joint associated with the adapted virtual skeleton comprise Cartesian coordinates specifying virtual skeletal joint position and angles specifying virtual skeletal joint rotation.

Clause 8. The computer implemented method according to at least one of clauses 1-7, wherein the capability profile comprises computing device capability information associated with a computing device to use the data defining the adapted virtual skeleton to display an avatar incorporating the adapted virtual skeleton.

Clause 9. The computer implemented method according to clause 8, wherein the capability profile further comprises virtual skeleton information identifying one or more virtual skeletal segments to be included with the data defining the adapted virtual skeleton.

Clause 10. A computer implemented method, comprising: providing, by a computing device, a capability profile comprising information usable to adapt data defining a virtual skeleton stored in a computer storage; receiving, by the computing device, data defining an adapted virtual skeleton derived from the data defining the virtual skeleton stored in the computer storage, the adapted virtual skeleton having a virtual skeletal complexity being less complex than a virtual skeletal complexity of the virtual skeleton stored in the computer storage, the data defining the adapted virtual skeleton generated based on the information comprised in the capability profile; and storing, by the computing device, the data defining the adapted virtual skeleton in a computer storage.

Clause 11. The computer implemented method according to clause 10, wherein the data defining the adapted virtual skeleton is received from at least one computer associated with a distributed computer network.

Clause 12. The computer implemented method according to at least one of clauses 10-11, wherein the data defining the virtual skeleton stored in the computer storage comprises a plurality of virtual skeletal joints each having an associated plurality of virtual skeletal joint parameters, the adapted virtual skeleton having fewer virtual skeletal joint parameters than a number of virtual skeletal joint parameters associated with the virtual skeleton stored in the computer storage.

Clause 13. The computer implemented method according to at least one of clauses 10-12, the data defining the adapted virtual skeleton is received in a data structure comprising at least parameters defining each virtual skeletal joint associated with the adapted virtual skeleton.

Clause 14. The computer implemented method according to clause 13, wherein the parameters defining each virtual skeletal joint associated with the adapted virtual skeleton comprise Cartesian coordinates specifying virtual skeletal joint position and angles specifying virtual skeletal joint rotation.

Clause 15. The computer implemented method according to at least one of clauses 10-14, wherein the capability profile comprises computing device capability information associated with the computing device to use the data defining the adapted virtual skeleton to display an avatar incorporating the adapted virtual skeleton.

Clause 16. The computer implemented method according to clause 15, wherein the capability profile further comprises virtual skeleton information identifying one or more virtual skeletal segments to be included with the data defining the adapted virtual skeleton.

Clause 17. A computing device, comprising: a processor; a computer-readable storage medium in communication with the processor, the computer-readable storage medium having computer-executable instructions stored thereupon which, when executed by the processor, cause the processor to: analyze a capability profile comprising information usable by the computing device to adapt data defining a virtual skeleton; adapt the data defining the virtual skeleton based on the information comprised in the capability profile, the adapting comprising reducing complexity of the data defining the virtual skeleton based on the information comprised in the capability profile, and generating data defining an adapted virtual skeleton; and store the adapted virtual skeleton.

Clause 18. The computing device according to clause 17, wherein the computer-executable instructions, when executed by the processor, further cause the processor to receive the capability profile from a remote computing device coupled to the computing device to adapt the data defining the virtual skeleton.

Clause 19. The computing device according to at least one of clauses 17-18, wherein the data defining the virtual skeleton comprises a plurality of virtual skeletal joints each having an associated plurality of parameters, and wherein reducing complexity of the data defining the virtual skeleton based on the information comprised in the capability profile comprises eliminating a plurality of parameters associated with at least one of the plurality of virtual skeletal joints.

Clause 20. The computing device according to clause 19, wherein the eliminated plurality of parameters associated with at least one of the plurality of virtual skeletal joints comprises at least Cartesian coordinates specifying a position of the at least one of the plurality of virtual skeletal joints associated with the data defining the virtual skeleton.

Although the techniques have been described in language specific to structural features and/or methodological acts, it is to be understood that the appended claims are not necessarily limited to the features or acts described. Rather, the features and acts are described as example implementations of such techniques.

The implementations described herein address the technical need to provide virtual skeletons based on capabilities associated with computing devices. To address at least this technical need, the implementations described herein provide computing devices that analyze capability profiles to generate adapted virtual skeletons based on a virtual skeleton that may be a master virtual skeleton or a highly detailed virtual skeleton. At least one benefit of providing such adapted virtual skeletons is the elimination of unnecessary processor overhead associated with the use of computing devices to generate individual virtual skeletons for a plurality of computing devices. The elimination of unnecessary processor overhead reduces battery drain and eliminates unnecessary memory use associated with computing devices. Other technical benefits not specifically identified herein can also be realized through implementations of the disclosed technologies.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a devices and systems may be improved as the use of the techniques disclosed herein enable users and individuals remotely manipulate rendered streams within a graphical environment associated with a communication session to better reflect their interactions in the communication session. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer implemented method, comprising:
analyzing, by a computing device, a capability profile comprising a hardware resource level of the computing device, wherein the hardware resource level indicates a level of at least one of processing or graphic capabilities of the computing device and one or more motion tracking capabilities of an avatar system for tracking at least one of a position or a movement of a user;
retrieving, by the computing device, data defining a virtual skeleton stored in a computer storage;
adapting, by the computing device, the data defining the virtual skeleton based on the hardware resource level of the computing device and the one or more motion tracking capabilities of the avatar system, the adapting by the computing device comprising reducing a complexity of the data defining the virtual skeleton based on the hardware resource level of the computing device and the one or more motion tracking capabilities of the avatar system;
generating, by the computing device, data defining an adapted virtual skeleton from the adapted data;
storing, by the computing device, the data defining the adapted virtual skeleton; and
displaying, by the computing device, an avatar incorporating the data defining the adapted virtual skeleton.

2. The computer implemented method according to claim 1, wherein the hardware resource level of the computing device is indicated by a low resource level, a medium resource level, or a high resource level.

3. The computer implemented method according to claim 2, wherein the computing device to adapt the data defining the virtual skeleton stored in the computer storage is part of a distributed computer network.

4. The computer implemented method according to claim 1, wherein the virtual skeleton stored in the computer storage comprises data defining a plurality of virtual skeletal joints each having an associated plurality of parameters, and wherein reducing complexity of the data defining the virtual skeleton based on information comprised in the capability profile comprises eliminating a plurality of parameters associated with the data defining at least one of the plurality of virtual skeletal joints.

5. The computer implemented method according to claim 4, wherein the eliminated plurality of parameters associated with the data defining the at least one of the plurality of virtual skeletal joints comprises at least Cartesian coordinates specifying a position of the at least one of the plurality of virtual skeletal joints associated with the data defining the virtual skeleton stored in computer storage.

6. The computer implemented method according to claim 1, wherein generating the data defining the adapted virtual skeleton comprises associating the data defining the adapted virtual skeleton with a data structure comprising at least parameters defining each virtual skeletal joint associated with the adapted virtual skeleton.

7. The computer implemented method according to claim 6, wherein the parameters defining each virtual skeletal joint associated with the adapted virtual skeleton comprise Cartesian coordinates specifying virtual skeletal joint position and angles specifying virtual skeletal joint rotation.

8. The computer implemented method according to claim 1, wherein the one or more motion tracking capabilities of the avatar system includes monitoring head position, monitoring head rotation, eye tracking, gaze tracking, hand tracking, and finger tracking capabilities of the avatar system.

9. The computer implemented method according to claim 1, wherein the adapting, by the computing device, the data defining the virtual skeleton based on the one or more motion tracking capabilities of the avatar system includes a number of virtual skeletal joints from the data defining the virtual skeleton that are eliminated based on the capabilities of the motion tracking of the avatar system.

10. A computer implemented method, comprising:
providing, by a computing device, a capability profile comprising a hardware resource level of the computing device, wherein the hardware resource level indicates a level of at least one of processing or graphic capabilities of the computing device and one or more motion tracking capabilities of an avatar system for tracking at least one of a position or a movement of a user;
receiving, by the computing device, data defining an adapted virtual skeleton derived from the data defining the virtual skeleton stored in a computer storage and the one or more motion tracking capabilities of the avatar system, the adapted virtual skeleton having a virtual skeletal complexity being less complex than a virtual skeletal complexity of the virtual skeleton stored in the computer storage, the data defining the adapted virtual skeleton generated based on the hardware resource level of the computing device and the one or more motion tracking capabilities of the avatar system;
storing, by the computing device, the data defining the adapted virtual skeleton; and
displaying, by the computing device, an avatar incorporating the data defining the adapted virtual skeleton.

11. The computer implemented method according to claim 10, wherein the data defining the adapted virtual skeleton is received from at least one computer associated with a distributed computer network.

12. The computer implemented method according to claim 10, wherein the data defining the virtual skeleton stored in the computer storage comprises a plurality of virtual skeletal joints each having an associated plurality of virtual skeletal joint parameters, the adapted virtual skeleton having fewer virtual skeletal joint parameters than a number of virtual skeletal joint parameters associated with the virtual skeleton stored in the computer storage.

13. The computer implemented method according to claim 10, the data defining the adapted virtual skeleton is received in a data structure comprising at least parameters defining each virtual skeletal joint associated with the adapted virtual skeleton.

14. The computer implemented method according to claim 13, wherein the parameters defining each virtual skeletal joint associated with the adapted virtual skeleton comprise Cartesian coordinates specifying virtual skeletal joint position and angles specifying virtual skeletal joint rotation.

15. The computer implemented method according to claim 10, wherein the capability profile further comprises computing device capability information associated with the computing device to use the data defining the adapted virtual skeleton to display the avatar incorporating the adapted virtual skeleton.

16. The computer implemented method according to claim 15, wherein the capability profile further comprises virtual skeleton information identifying one or more virtual skeletal segments to be included with the data defining the adapted virtual skeleton.

17. A computing device, comprising:
a processor;
a computer-readable storage medium in communication with the processor, the computer-readable storage medium having computer-executable instructions stored thereupon which, when executed by the processor, cause the processor to:
analyze a capability profile comprising a hardware resource level of a computing device, wherein the hardware resource level indicates a level of at least one of processing or graphic capabilities of the computing device and one or more motion tracking capabilities of an avatar system for tracking at least one of a position or a movement of a user;
adapt data defining a virtual skeleton based on the hardware resource level of the computing device and the one or more motion tracking capabilities of the avatar system, the adapting comprising reducing complexity of the data defining the virtual skeleton based on the hardware resource level of the computing device and the one or more motion tracking capabilities of the avatar system,
generate data defining an adapted virtual skeleton from the adapted data;
store the adapted virtual skeleton; and
display, by the computing device, an avatar incorporating the data defining the adapted virtual skeleton.

18. The computing device according to claim 17, wherein the computer-executable instructions, when executed by the processor, further cause the processor to receive the capability profile from a remote computing device coupled to the computing device to adapt the data defining the virtual skeleton.

19. The computing device according to claim 17, wherein the data defining the virtual skeleton comprises a plurality of virtual skeletal joints each having an associated plurality of parameters, and wherein reducing complexity of the data defining the virtual skeleton based on information comprised in the capability profile comprises eliminating a plurality of parameters associated with at least one of the plurality of virtual skeletal joints.

20. The computing device according to claim 19, wherein the eliminated plurality of parameters associated with at least one of the plurality of virtual skeletal joints comprises at least Cartesian coordinates specifying a position of the at least one of the plurality of virtual skeletal joints associated with the data defining the virtual skeleton.

* * * * *